(12) United States Patent
Takamura et al.

(10) Patent No.: US 9,797,109 B2
(45) Date of Patent: Oct. 24, 2017

(54) RETRACTION OF OIL SLICKS USING SURFACTANTS

(71) Applicant: University of Wyoming, Laramie, WY (US)

(72) Inventors: Koichi Takamura, Penn Valley, CA (US); Norman R. Morrow, Laramie, WY (US); Nina Loahardjo, Laramie, WY (US); Winoto Winoto, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 13/653,942

(22) Filed: Oct. 17, 2012

(65) Prior Publication Data

US 2013/0168324 A1  Jul. 4, 2013

Related U.S. Application Data

(60) Provisional application No. 61/548,151, filed on Oct. 17, 2011.

(51) Int. Cl.
| | |
|---|---|
| *E02B 15/04* | (2006.01) |
| *B01D 17/04* | (2006.01) |
| *C02F 1/52* | (2006.01) |
| *C02F 1/68* | (2006.01) |
| *E02B 15/00* | (2006.01) |
| *C02F 1/00* | (2006.01) |

(Continued)

(52) U.S. Cl.
CPC ............ *E02B 15/041* (2013.01); *B01D 17/04* (2013.01); *C02F 1/682* (2013.01); *C02F 1/40* (2013.01); *C02F 2103/08* (2013.01); *C02F 2305/04* (2013.01)

(58) Field of Classification Search
None
See application file for complete search history.

(56) References Cited

U.S. PATENT DOCUMENTS 3,635,819 A * 1/1972 Kaiser ........................... 210/634
3,886,067 A * 5/1975 Miranda ...................... 210/680
(Continued)

OTHER PUBLICATIONS

Stepan, Product Bulletin: Bio-Soft® N-91 Series, p. 1, 2011.*
(Continued)

*Primary Examiner* — Clare Perrin
(74) *Attorney, Agent, or Firm* — Samuel M. Freund; Cochran Freund & Young LLC (57) ABSTRACT

A method for retracting oil on a water surface, and a method for reducing the quantity of oil on an oil control boom are described. Spreading of oil can be reversed by reducing the surface tension of the seawater, for example by using a low concentration of a water-soluble surfactant, such as a nonionic surfactant. A controlled amount of the surfactant may be continuously discharged at the inner-wall of a spill control boom surrounding the oil spill. The spilled oil is caused to retract away from the boom toward the center of the area encircled thereby, such that the oil layer becomes sufficiently thick to be more effectively removed mechanically. The surfactant also reduces the amount of oil on the spill control boom, whereby the boom can easily be removed from a remediated oil spill and reused at a later date without further cleaning.

11 Claims, 7 Drawing Sheets

(51) Int. Cl.
*B01D 21/00* (2006.01)
*B03D 3/00* (2006.01)
*C02F 1/40* (2006.01)
*C02F 103/08* (2006.01)

(56) References Cited

U.S. PATENT DOCUMENTS

| | | | | |
|---|---|---|---|---|
| 4,356,088 | A * | 10/1982 | Matteelli | E02B 15/041 210/198.1 |
| 5,252,138 | A * | 10/1993 | Guymon | C10G 1/04 134/40 |
| 5,406,019 | A * | 4/1995 | Dean | B09C 1/08 405/128.25 |
| 5,885,602 | A * | 3/1999 | Levy | 424/405 |
| 7,008,139 | B2 * | 3/2006 | Nilsen | E02B 15/08 210/242.1 |
| 2012/0074067 | A1 * | 3/2012 | Podella | C02F 1/681 210/668 |

OTHER PUBLICATIONS

K. Takamura et al., "Spreading and Retraction of Spilled Crude Oil on Seawater," Crude Oil Exploration in the World, ISBN 978-953-51-0379-0, edited by Mohamed Abdel-Aziz Younes, InTech-Open Access, Mar. 2012, http://www.intechopen.com/articles/show/title/spreading-and-retraction-of-spilled-crude-oil-on-sea-water, 107-125.

M. Kunieda et al., "Spreading of Multi-component Oils on Water," Energy Fuels 2012, 26, 2736-2741.

* cited by examiner

RETRACTION OF OIL SLICKS USING SURFACTANTS

CROSS-REFERENCE TO RELATED APPLICATIONS

The present application claims the benefit of U.S. Provisional Patent Application No. 61/548,151 for "Retraction Of Oil Slicks Using Surfactants" which was filed on Oct. 17, 2011, the entire contents of which is hereby specifically incorporated by reference herein for all that it discloses and teaches.

FIELD OF THE INVENTION

The present invention relates generally to confining oil slicks and, more particularly, to the use of surfactants for reducing the size of an oil slick for more effective oil removal.

BACKGROUND OF THE INVENTION

Oil spills due to releases of crude oil from tankers, offshore platforms, drilling rigs, and wells, as well as spills of refined petroleum (such as gasoline or diesel) and their by-products, and heavier fuels used by large ships such as bunker fuel, if uncontrolled may have devastating and lasting environmental impact. Such spills may be controlled by chemical dispersion, combustion, mechanical containment, and/or adsorption. Controlled burning can reduce the amount of oil in water, but can only be done in low wind conditions. Dispersants create smaller oil droplets which may be scattered by currents, and may degrade more easily. Dry hydrophobic, water insoluble polymers that both adsorb and absorb hydrocarbons can clean up oil spills by changing the physical state of oil from liquid to a semi-solid or a rubber-like material that floats on water, rendering it readily collectable. However, collected solidifiers must be disposed of in landfills, recycled as an additive in asphalt or rubber products, or burned as a low ash fuel. Oil-absorbing materials such as hair and fabrics may also be used. Oil may be "vacuumed" from the surface, along with some water, and the mixture centrifuged to separate the oil from the water, thereby permitting nearly pure oil to be collected, the water often being returned to the sea. Oil skimming devices may also be used.

Typically, large floating barriers, known as booms, are used to surround and confine an oil slick, thereby enabling chemical and biological agents to be added to the oil to encourage its breakdown, and mechanical techniques to be used more efficiently.

SUMMARY OF THE INVENTION

Embodiments of the present invention overcome the disadvantages and limitations of the prior art by providing a method for reducing the size of an oil spill on a water surface.

Another object of embodiments of the present invention is to provide a method for maintaining oil spill control booms free of oil.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, the method for retracting an oil slick, hereof, includes: surrounding the oil slick with a floating oil control boom having a chosen length defining an enclosed area; reducing the surface tension of the water between the boom and the oil slick; and reducing the length of the boom to reduce the enclosed area.

In another aspect of the present invention and in accordance with its objects and purposes, the method for removing oil from a water surface, hereof, includes: surrounding the oil with a floating oil control boom having a chosen length defining an enclosed area; reducing the surface tension of the water between the boom and the oil; reducing the length of the boom to reduce the enclosed area; and mechanically removing the oil.

In yet another aspect of the present invention and in accordance with its objects and purposes, the method for removing oil from a water surface, hereof, includes: surrounding the oil with a floating oil control boom having a chosen length defining an enclosed area; dispersing at least one water-soluble surfactant in the water from the vicinity of the boom between the boom and the oil, thereby reducing the surface tension of the water between the boom and the oil; reducing the length of the boom to reduce the enclosed area; and mechanically removing the oil.

In still another aspect of the present invention and in accordance with its objects and purposes, the method for reducing oil on an oil control boom, hereof, includes: placing the boom in the water; dispersing a chosen concentration of at least one water-soluble surfactant in the water in contact with the boom; and maintaining the chosen concentration of surfactant in contact with the boom.

Benefits and advantages of embodiments of the present invention include, but are not limited to, providing a method for reducing the size of an oil slick using surfactants having low toxicity, such that mechanical recovery thereof is rendered more effective, and providing a method for reducing oil on the surfaces of an oil control boom, such that the oil control boom may be subsequently used without cleaning.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3 illustrates the effect of adding a small quantity of non-ionic surfactant close to the inner the wall of a beaker containing seawater, FIG. 3A showing an oil spill over the inner and outer beaker with most of the oil contained inside inner beaker.

DETAILED DESCRIPTION OF THE INVENTION

Crude oil spreads rapidly over seawater due to the high values of the spreading coefficient (25-35 mN/m). The use of water-insoluble monomolecular films can be used to compress spilled oil into lenses of increased thickness that occupy smaller surface area, and can be mechanically retrieved. Briefly, embodiments of the present invention include another method for retracting oil on a water surface, and a method for reducing the quantity of oil on an oil spill control boom. The spreading of an oil slick can be reversed by reducing the surface tension of the water. A controlled amount of a water-soluble surfactant, for example, a low concentration of non-ionic surfactant, may be continuously discharged at the inner wall of an oil spill control boom surrounding the oil spill. The spilled oil is caused to retract away from the boom toward the center of the area encircled thereby, such that the oil layer becomes sufficiently thick to be more effectively removed chemically or mechanically. The surfactant also reduces the amount of oil on surfaces of the spill control boom, whereby the boom can be removed from a remediated oil spill and reused at a later date without further cleaning.

When crude oil is spilled in an open body of water, oil spill control booms are utilized to confine the spilled crude oil to a limited area, whereby the oil is compressed into lenses having increased thickness. The oil within the enclosed area can often then be more efficiently mechanically removed. However, when the crude oil spreads rapidly, a thin layer is formed on the water surface, and mechanical recovery of the dispersed oil becomes inefficient. Embodiments of the present invention are expected to be effective for causing the oil to move away from the boom. That is, if a small amount of surfactant, such as BIO-SOFT® is continuously discharged adjacent to the wall of the deployed boom facing the oil slick (the inner wall of the boom), the oil slick is expected to retract toward the center of the area enclosed by the boom, as will be described in detail hereinbelow. Such retraction decreases the area of the oil slick and increases its thickness, thereby facilitating mechanical recovery thereof.

Further, as will be discussed in more detail hereinbelow, laboratory observations indicate that crude oil can move over the surface of a wet oil spill control boom, and that the continuous discharge of small quantities of at least one chosen surfactant adjacent to the inner wall of a deployed boom will prevent the oil from over-spilling or climbing over the boom surface, thereby freeing the deployed boom of most of the contamination by crude oil.

The spreading of oil on a water surface can be described by:

$$S = \gamma_{w/a} - (\gamma_{o/a} + \gamma_{w/o}),$$

where S is the spreading coefficient, and $\gamma_{w/a}$, $\gamma_{o/a}$, and $\gamma_{w/o}$ are the surface tension of water, the surface tension of oil, and the interfacial tension between oil and water, respectively. Oil spreads spontaneously when $S>0$. The surface tension, $\gamma_{o/a}$, and the interfacial tension, $\gamma_{w/o}$, values for typical crude oils relative to seawater, are between 20 mN/m and 30 mN/m, and between 15 mN/m and 30 mN/m, respectively. By comparison, the surface tension of seawater, $\gamma_{w/a}$, is about 72 mN/m. The combination of low surface and interfacial tension values of the crude oil, and the high surface tension value for seawater results in a high, positive value for the spreading coefficient: $10<S<30$, which results in rapid spreading of crude oil over the water when there is an oil spill. Selected physico-chemical properties for five crude oils are set forth in TABLE 1. All measurements were made at 20° C.

TABLE 1

| Crude Oil | Aromatics % | Asphaltenes (n-$C_6$) % | Resins % | Density g/cm$^3$ | Surf. Ten. mN/m | Int. Ten.[1] mN/m | S mN/m | Visc. mPa s |
|---|---|---|---|---|---|---|---|---|
| Lustre | 18 | 1.0 | 9.0 | 0.840 | 25.2 | 20.5 | 27.8 | 5.0 |
| Gulfaks | 26 | 0.3 | 16 | 0.894 | 28.1 | 18.4 | 27.0 | 35 |
| Cottonwood | 23 | 2.9 | 17 | 0.893 | 27.3 | 21.6 | 24.5 | 26 |
| LC | 25 | 3.2 | 12 | 0.903 | 28.0 | 25.7 | 19.8 | 39 |
| Minnelusa | 20 | 9.1 | 13 | 0.904 | 28.8 | 27.4 | 17.2 | 58 |

[1]Against seawater at pH = 6-7

Evaporation of light alkanes, combined with preferential accumulation of asphaltenes and resins in the aromatic-rich interface region, promotes formation of tar balls far from the site of the original spill.

A more detailed analysis of the spreading of a liquid as a thin film on another liquid, may be found in: "Spreading And Retraction Of Spilled Crude Oil On Seawater," by K. Takamura et al., Crude Oil Exploration in the World, ISBN 978-952-51-0379-0, edited by Mohamed Abdel-Aziz Younes, InTech-Open Access, March 2012, http://www.intechopen.com/articles/show/title/spreading-and-retraction-of-spilled-crude-oil-on-sea-water, the entire disclosure and teachings of which are hereby incorporated by reference herein.

Figure 1:
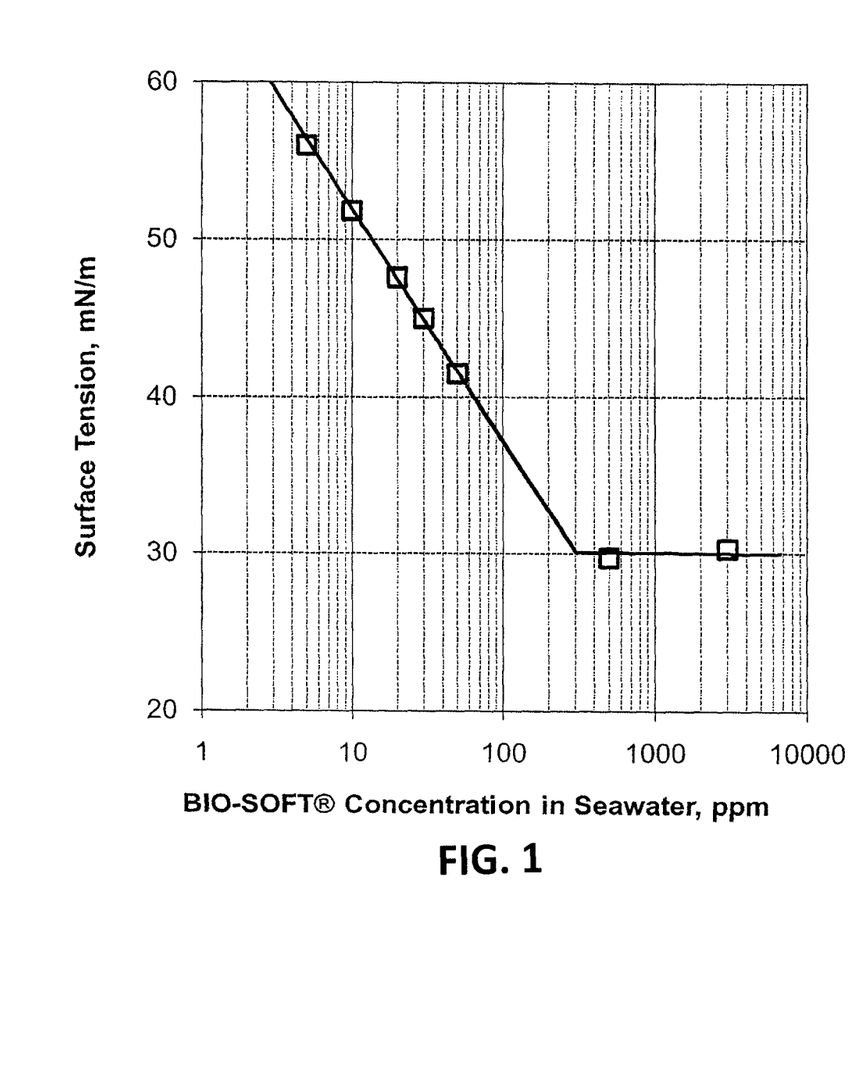
FIG. 1 is a graph of the surface tension of seawater as a function of the concentration of non-ionic surfactant added to the seawater.

Reference will now be made in detail to the present embodiments of the invention, examples of which are illustrated in the accompanying drawings. It will be understood that the FIGURES are for the purpose of describing particular embodiments of the invention and are not intended to limit the invention thereto. Turning first to FIG. 1, a graph of the surface tension of seawater as a function of the concentration of the non-ionic surfactant, BIO-SOFT® N91-8 (Stepan, Ill., USA), used as received, and added to the seawater is shown. The surfactant is characterized as $CH_3(CH_2)_nO(CH_2CH_2O)_yH$, where $n=8$-$10$, and the average number of moles of ethoxylation, $y=8.3$. The surface tension of the synthetic seawater (NaCl, KCl, $CaCl_{20}\cdot 2H_2O$ and $MgCl_{20}\cdot 6H_2O$ of 28.0, 0.935, 1.56 and 11.7 g/L, respectively) having a pH between 6 and 7.0 was measured as a function of BIO-SOFT® concentration using the Wilhelmy plate method as adapted for the Krüss K100 Tensiometer. A Krüiss DVT-10 drop volume tensiometer was used to measure the interfacial tension between the crude oil and seawater.

Nonionic surfactants having long hydrocarbon chains (typically, but not limited to, between C10 and C16) and (ethyleneoxide)$_n$ moieties, where n may be between 2 and 50, are expected to be useful for embodiments of the present method. Nonionic surfactants having n<10, and more particularly 3<n<8, are expected to be advantageous since it is beneficial if the surfactant molecules quickly accumulate at the air/water interface. However, for larger n values, the diffusion of surfactant molecules towards the air/water interface is expected to be slow. Nonionic surfactants having branched hydrocarbon chains instead of linear chains are also believed to be advantageous since surfactants with branched hydrocarbon chains have less tendency to form micelles, and greater tendency to preferentially accumulate at the air/water interface. Low critical micelle concentrations are a reason that nonionic surfactants are believed to be advantageous. Anionic surfactant may also be used in embodiments of the present invention, although more material would be required (typically, the critical micelle concentration of anionic surfactants are 100× that of non-ionic surfactant).

Although BIO-SOFT® N91-8 (BIO-SOFT is a registered trademark of Stepan Company, Illinois, USA.) has been used in the practice of embodiments of the present invention, other surfactants may clearly be used to implement this invention. Nonionic surfactants are ecologically friendly. However, if safety is a primary concern, the water-soluble nonionic surfactants Tween 20 or 30 (Polysorbate surfactant 20 or 30), as examples, may be used. These surfactants are sugar derivatives and are approved as food additives. DAWN® commercial dishwashing liquid (Procter & Gamble), a mixture of anionic and nonionic surfactants, has been successfully used by the present inventors in laboratory demonstrations of the present method for retracting oil slicks.

Returning to FIG. 1, it is observed that a low concentration level of surfactant effectively lowers the surface tension of water; that is, addition of as little as 30 ppm of BIO-SOFT® N91-8 lowers $\gamma_{w/a}$ of the seawater by 28 mN/m, or from 73 mN/m to 45 mN/m. The diagonal line shows a typical surface tension behavior as a function of surfactant concentration. In the region between small added amounts to about 300 ppm, surfactant added to water accumulates on the surface, thereby reducing the surface tension. At a certain concentration, termed the critical micelle concentration, which is specific to each surfactant (approximately 300 ppm for BIO-SOFT), the surface is saturated with surfactant molecules and additional added surfactant no longer reduces the surface tension. The horizontal line shows a constant surface tension above the critical micelle concentration, where the added surfactant molecules are located below the surface of the water, forming micelles.

Figure 2:
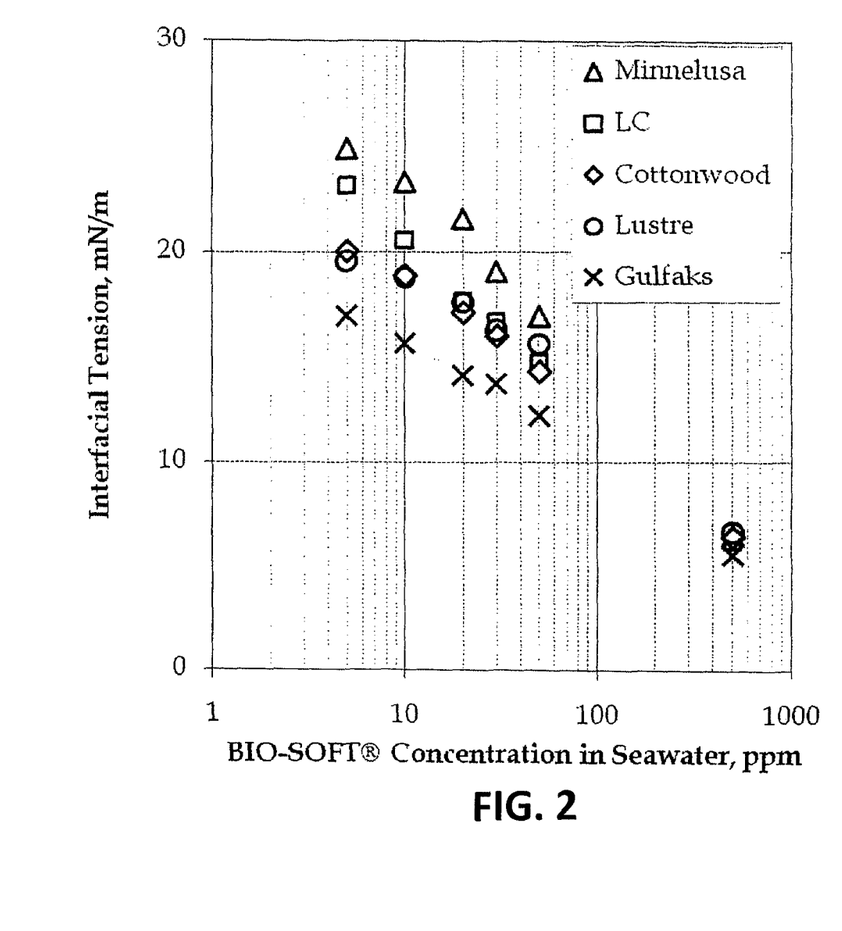
FIG. 2 is a graph of the interfacial tension of several crude oils as a function of the concentration of non-ionic surfactant added to the seawater.
Figure 3A:
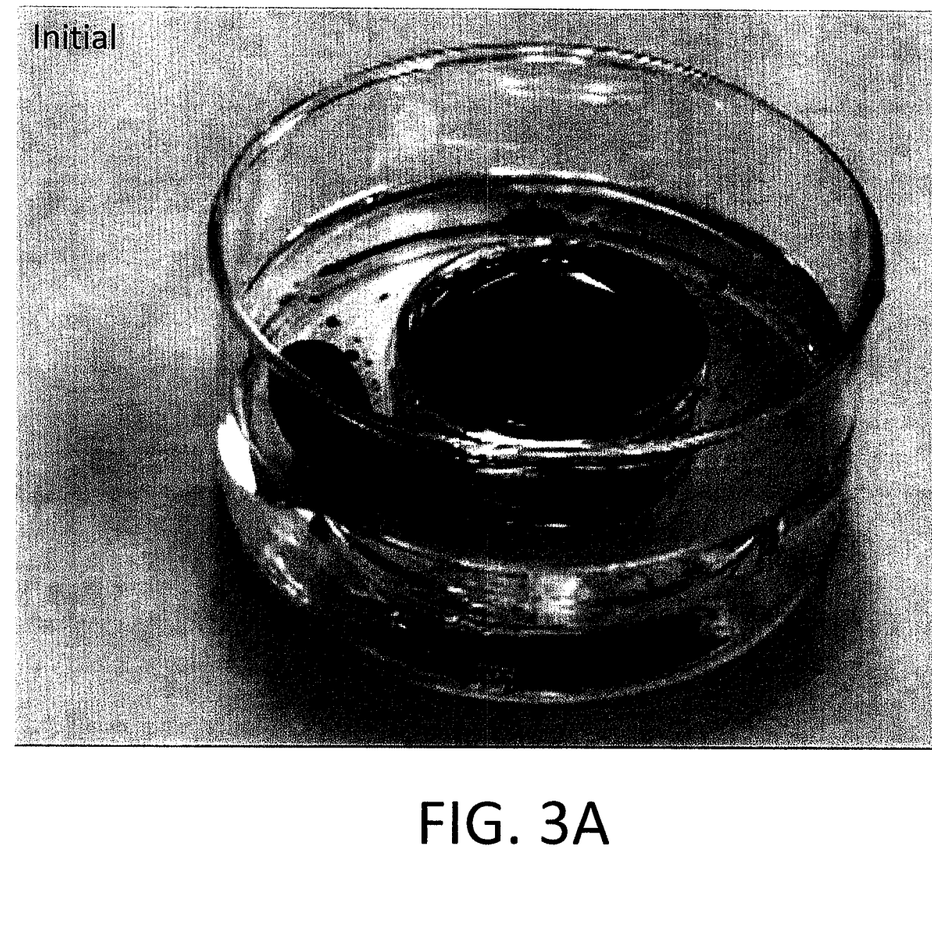
Figure 3B:
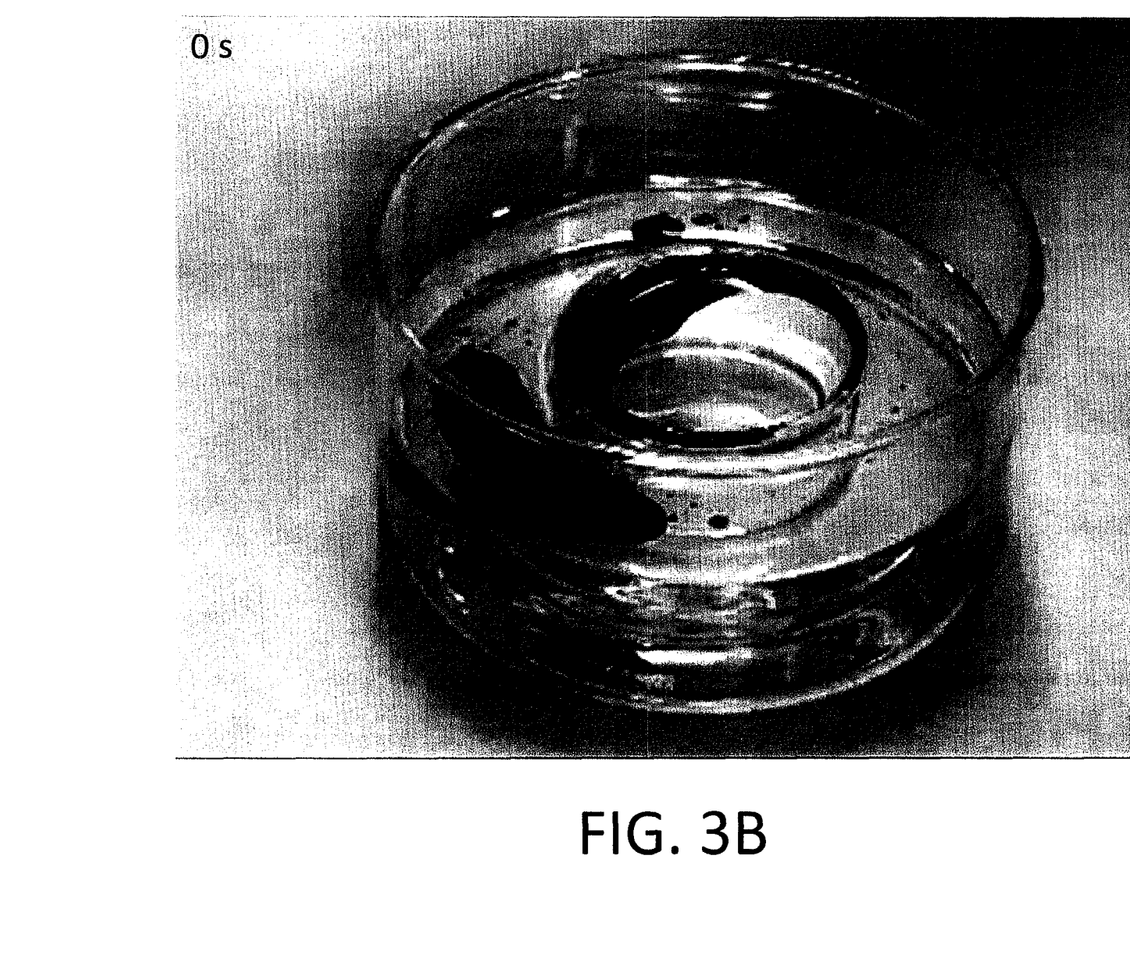
FIG. 3B shows the immediate oil retraction after a non-ionic surfactant was added.
Figure 3C:
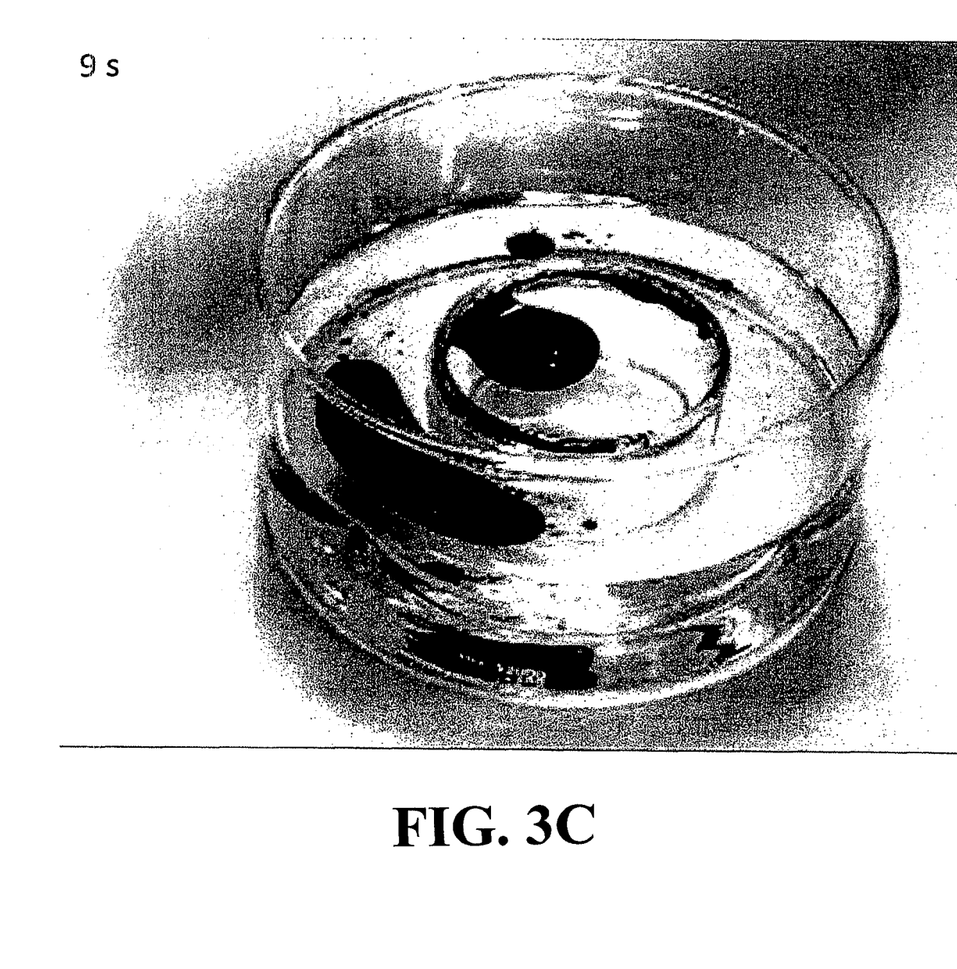
FIG. 3C shows the oil having formed an oil lens near the center of the inner beaker, within 9 s (seconds) of adding the non-ionic surfactant.
Figure 3D:
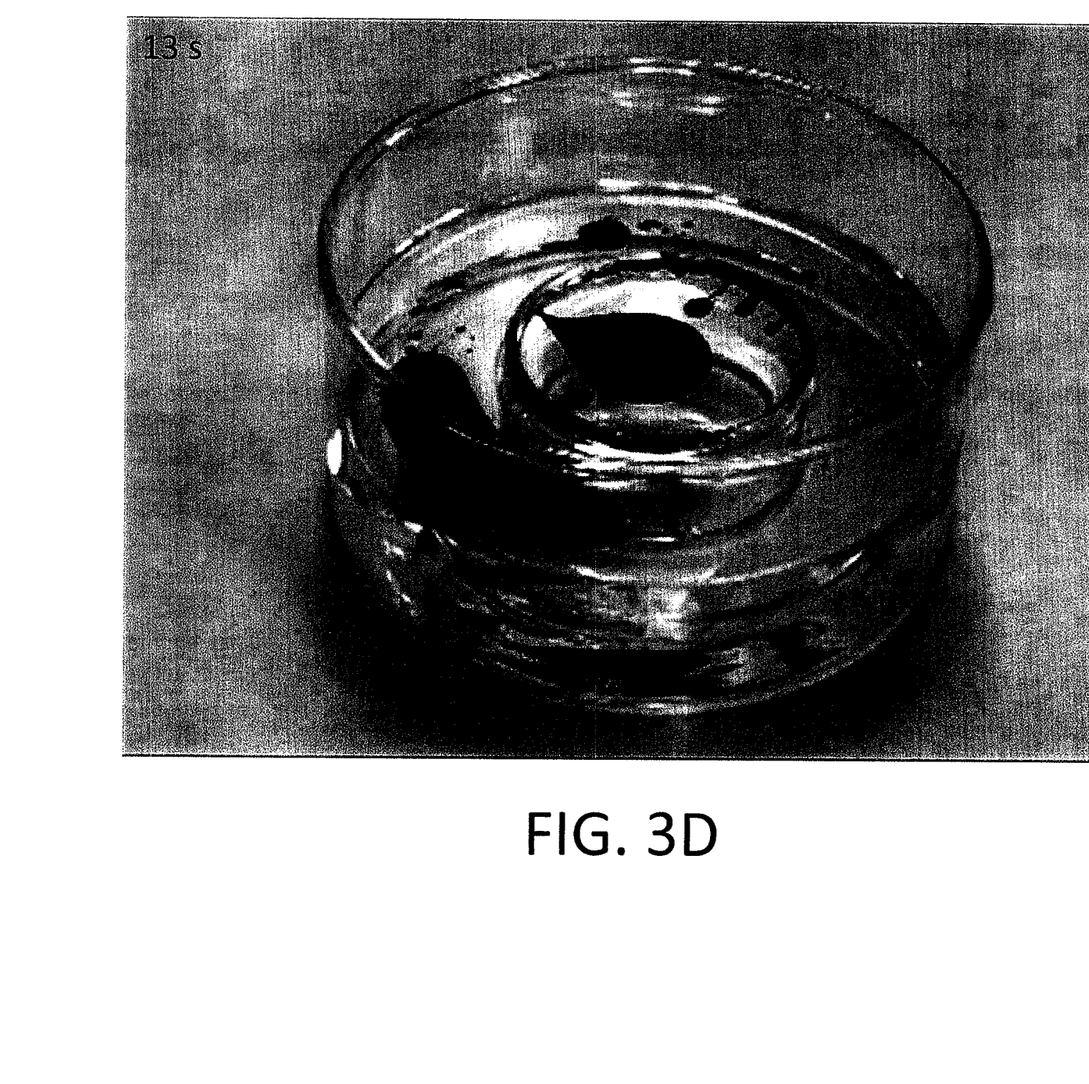
FIG. 3D shows the small amount of oil previously located near the wall moving closer to the oil lens in the center.
Figure 3E:
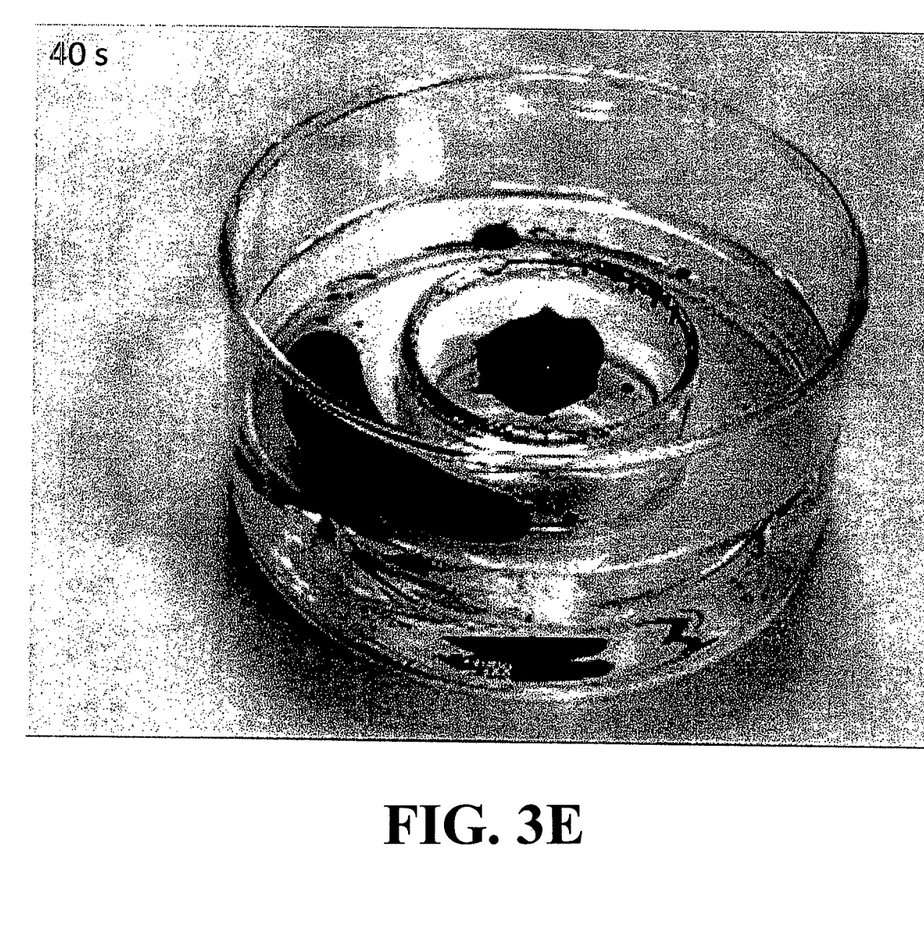
FIG. 3E shows that within 40 s, most of the oil has moved away from the wall.

FIG. 2 represents the measured interfacial tension of 5 crude oils as a function of the concentration of the same non-ionic surfactant. The $\gamma_{w/o}$ of Minnelusa oil is seen to be reduced by only 8 mN/m, from 27 to 19 mN/m, with the same concentration level of BIO-SOFT® N91-8. The addition of surfactant should decrease the seawater surface tension more than it decreases interfacial tension; therefore, the reduced spreading behavior (quantified as the spreading coefficient) makes the oil slick retract to form oil lenses.

The Equation for S set forth hereinabove, suggests that addition of small amounts of non-ionic surfactant to the water would prevent spreading of crude oil over the surface of seawater (S<0). The spreading coefficients (S) for five crude oils are shown in TABLE 2. They were calculated using constant $\gamma_{o/a}$ for each crude oil, with $\gamma_{w/a}$ as a function of BIO-SOFT® N91-8 concentration, and with $\gamma_{w/o}$ for seawater against crude oil (values in the top 5 lines of TABLE 2), or with $\gamma_{w/o}$ for seawater as a function of BIO-SOFT® N91-8 concentration (values in the bottom 5 lines of TABLE 2). The "INT" indicates that slow spreading of the oil droplet was still observed, which suggests that the surfactant molecules are not absorbed at the rapidly spreading frontal perimeter of the oil/seawater interface.

TABLE 2

| Crude oil | Seawater with BIO-SOFT ®, ppm | | | | |
|---|---|---|---|---|---|
| | 0 | 5 | 10 | 20 | 30 |
| | S (with $\gamma_{wo}$ of seawater) | | | | |
| Lustre | 28 | 10 | 6 | 2 | −1 |
| Gulfaks | 27 | 10 | 5 | 1 | −1 |
| Cottonwood | 25 | 7 | 3 | −1 | −4 |
| LC | 20 | 2 | −2 | −6 | −9 |
| Minnelusa | 17 | 0 | −4 | −9 | −11 |
| | S (with $\gamma_{wo}$ of seawater/BIO-SOFT ®) | | | | |
| Lustre | 28 | 11 | 8 | 5 | 4 |
| Gulfaks | 27 | 11 | 8 | 5 | 3 |
| Cottonwood | 25 | 9 | 6 | 3 | 2 |
| LC | 20 | 5 | 3 | 2 | 0 |
| Minnelusa | 17 | 2 | 0 | −3 | −3 |
| | Initial Spreading Behavior | | | | |
| Lustre | SP | INT | INT | NO | NO |
| Gulfaks | SP | INT | INT | NO | NO |
| Cottonwood | SP | INT | INT | NO | NO |
| LC | SP | NO | NO | NO | NO |
| Minnelusa | SP | INT | INT | NO | NO |

Spreading of crude oil can effectively be reversed by reducing the surface tension of the seawater by adding a low level of a surfactant to the water. The estimated amounts of BIO-SOFT® N91-8, in ppm, to render S=0 are 27, 24, 17, 7, and 5 for Lustre, Gulfaks, Cottonwood, LC, and Minnelusa, respectively, which were confirmed in experiments similar to that described in EXAMPLE 1, hereinbelow, and illustrated in FIG. 3, hereof. Diffusion of the surfactant away from the surface clearly reduces the surface concentration, whereas a few weeks to a month are required to degrade the surfactant. As will be discussed hereinbelow, a chosen level of surfactant is maintained in the region of the boom by slowly releasing the surfactant in this region.

Having generally described the present invention, the following EXAMPLES are set forth to provide additional details.

Example 1

FIG. 3 illustrates the effect of adding three drops of a water solution of 500 ppm of BIO-SOFT® non-ionic surfactant near the wall of a beaker containing 35 mL of seawater to which Minnelusa crude oil has been added. This amount of surfactant corresponds to about 2 ppm of nonionic surfactant in the seawater at the equilibrium condition. The crude oil was observed to spread quickly (S=17 mN/m) over the water surface; a thin oil film covered the entire surface of the seawater in the beaker within a second. The following views of the oil retraction as a function of time illustrate that the water surface only needs to be covered with a near mono-layer of the surfactant. Therefore, a slow release of the surfactant will keep the interface concentration above the critical level. FIG. 3A shows the initial spill over inner and outer beakers, with most of the oil contained inside inner beaker. FIG. 3B shows the almost instantaneous movement of the oil away from the location of the introduction of the surfactant close to the inner wall of the inner beaker; FIG. 3C shows the oil having formed an oil lens near the center of the inner beaker, within 9 s of adding the non-ionic surfactant; FIG. 3D shows a large portion of the oil previously located near the wall has moved closer to the oil lens in the center of the beaker by approximately 13 s. With about 40 s having passed, FIG. 3E illustrates that most of oil has moved away from the wall, and into the now detached oil lens (>1 mm in thickness). Such thicknesses can be efficiently mechanically skimmed from the open water surface. The retraction of the thin oil film was confirmed for all of the five crude oils listed hereinabove.

EXAMPLE 1 demonstrates that crude oil can spread vertically along the glass wall of the beaker when it is pre-wetted with water, which suggests that the crude oil can traverse a wet mechanical barrier. In other demonstrations of embodiments of the present method, when a drop of a 500 ppm water solution of BIO-SOFT® was introduced near the center of a slick of Minnelusa crude oil, the oil retracted away from the site of introduction.

Example 2

When the Lustre crude oil spread over the seawater surface was exposed to air for two days before addition of the surfactant, the retraction of the aged thin film caused by addition of 500 ppm drops of BIO-SOFT® N91-8 was observed to be significantly slower than for freshly spread oil. When the surfactant was added, the oil first retracts and then slowly redisperses on the surface after a few minutes.

In other demonstrations of embodiments of the present method, when a larger amount of Lustre crude oil than that utilized in the present EXAMPLE 2 was exposed to air for two days, a thin, semi-rigid film of aromatics, rich in polar asphaltenes and resins was found to cover the water surface. This semi-rigid film could be broken and rolled up. This observation simulates how wave action can cause formation of tar balls at sea far from the location of the initial spill of crude oil. Such tar balls are sticky because of their high aromatics content in the form of asphaltenes and resins.

Containers filled with at least one surfactant may be placed at selected locations along the inner surface of the boom, and in contact with the water. Such containers might be floating containers tethered to the boom. Small quantities of surfactant are continuously discharged into the water to maintain a chosen surface concentration thereof. As stated hereinabove, low concentrations of surfactants are required to cause the oil to move away from the control boom, keeping the boom free of oil and causing the oil to gather within the confines of the boom. Liquid surfactants may be mixed with solid materials such as kaolin and/or talc clay minerals to reduce the rate of dispersion into the seawater. Wave action would slowly release the surfactant and talc together to the surface of the open water. Such clay minerals, not only reduce the dissolution rate of the surfactants, but also become part of the surfactant monolayer for reducing the spread of the oil slick by improving the mechanical properties of the layer, whereby the efficiency and durability of the layer may be significantly improved.

Release of the surfactants may also be controlled by placing a selected number of holes in the containers, or by using a trap door mechanism, the opening and closing of which may be automatic or remotely controlled. Many variations are clearly possible. A porous pipe on the inner side of boom may be used, as may floating time release capsules tethered to the inside of the boom. Slow release of surfactant material to maintain parts-per-million concentrations of surfactant at or near the oil boom to prevent, or at least minimize contact of the oil boom with oil is advantageous.

Solutions having chosen concentrations below the critical micelle concentration, for example, about 500 ppm, depending on the surfactant, may also either be manually or automatically sprayed on the water using a spraying system mounted on the boom.

In situations where the oil slick is near the shore, or where there are a number of surfactant dispensing craft available, retraction may be achieved by spraying the water in the vicinity of only a portion of the oil slick, with or without the presence of floating oil control booms. A chosen length of floating oil control boom might also be employed without forming a closed area around the oil slick.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for retracting an oil slick, having a spreading coefficient, S, on a water surface, comprising the steps of: surrounding the oil slick with a floating oil control boom having length defining an enclosed area; dispersing at least one water-soluble surfactant having the chemical formula $CH_3(CH_2)_nO(CH_2CH_2O)_yH$, where $8 \leq n \leq 10$, and the average value for y is 8.3, in the water between the floating oil control boom and the oil slick adjacent to the wall of the floating oil control boom, to obtain a concentration consistent with maintaining the spreading coefficient at a value less than zero; and reducing the length of the floating oil control boom to reduce the enclosed area.

2. The method of claim 1, wherein the at least one water-soluble surfactant is mixed with solid materials such that the rate of dispersion of the at least one water-soluble surfactant into the water is reduced.

3. The method of claim 1, wherein the water comprises seawater.

4. The method of claim 1, further comprising the step of mechanically removing oil from the oil slick.

5. A method for removing an oil slick, having a spreading coefficient, S, from a water surface, comprising the steps of: surrounding the oil slick with a floating oil control boom having a length defining an enclosed area; dispersing at least one water-soluble surfactant having the chemical formula $CH_3(CH_2)_nO(CH_2CH_2O)_yH$, where $8 \leq n \leq 10$, and the average value for y is 8.3, in the water between the floating oil control boom and the oil slick adjacent to the wall of the floating oil control boom, to obtain a concentration consistent with maintaining the spreading coefficient at a value less than zero; and mechanically removing oil from the oil slick.

6. The method of claim 5, further comprising the step of reducing the length of the floating oil control boom to reduce the enclosed area.

7. The method of claim 5, wherein the at least one water-soluble surfactant is mixed with solid materials such that the rate of dispersion of the at least one water-soluble surfactant into the water is reduced.

8. The method of claim 5, wherein the water comprises seawater.

9. A method for reducing oil, having a spreading coefficient, S, on a floating oil control boom, comprising the steps of: placing the oil control boom in water; dispersing a chosen concentration of at least one water-soluble surfactant having the chemical formula $CH_3(CH_2)_nO(CH_2CH_2O)_yH$, where $8 \leq n \leq 10$, and the average value for y is 8.3, in the water in contact with the floating oil control boom; and maintaining the chosen concentration of the at least one water-soluble surfactant in contact with the floating oil control boom at a level consistent with the spreading coefficient of the oil being maintained at less than zero.

10. The method of claim 9, wherein the at least one water-soluble surfactant is mixed with solid materials such that the rate of dispersion of the at least one water-soluble surfactant into the water is reduced.

11. The method of claim 9, wherein the water comprises seawater.

* * * * *